United States Patent [19]

Oda

[11] Patent Number: 5,146,801
[45] Date of Patent: Sep. 15, 1992

[54] GEAR APPARATUS

[75] Inventor: Atsuhi Oda, Tochigi, Japan

[73] Assignee: Tochigifujisangyo Kabushiki Kaisha, Tochigi, Japan

[21] Appl. No.: 676,241

[22] Filed: Mar. 27, 1991

[30] Foreign Application Priority Data

Mar. 28, 1990 [JP] Japan .................................. 2-77044

[51] Int. Cl.[5] ............................................ F16H 1/14
[52] U.S. Cl. ............................................ 74/417; 475/221
[58] Field of Search .................... 74/417; 475/221, 225

[56] References Cited

U.S. PATENT DOCUMENTS

| | | | |
|---|---|---|---|
| 4,034,621 | 7/1977 | Ritter, Jr. ........................... | 74/417 X |
| 4,523,495 | 6/1985 | Sala ................................... | 475/221 |
| 4,527,443 | 7/1985 | Ohoka ............................... | 74/417 |
| 4,779,699 | 10/1988 | Hatano ............................. | 475/221 X |
| 4,784,236 | 11/1988 | Bausch et al. .................... | 475/221 X |

Primary Examiner—Dirk Wright
Attorney, Agent, or Firm—Graham & James

[57] ABSTRACT

In a gear apparatus including first and second axles arranged perpendicular to each other within a gear housing; a spur gear is fixed to the first axle; and first and second bevel gears are fixed to the first and second axles, respectively in mesh with each other, the first bevel gear is fixed to the first axle near a first bearing; the spur gear is fixed to the first axle between the first bevel gear and a second bearing; the second bevel gear is fixed to the second axle; and the first bearing for supporting the first axle is located in the vicinity of a small-diameter side surface of the second bevel gear. Therefore, the axial length of the first axle can be shortened, load applied to the spur gear can be supported uniformly on both the ends of the first axle, and the first bearing can be sufficiently lubricated by the rotating bevel gears, thus decreasing the apparatus size and increasing the apparatus life time.

6 Claims, 3 Drawing Sheets

GEAR APPARATUS

BACKGROUND OF THE INVENTION

1. Field of the Invention

The present invention relates to a gear apparatus suitable for use in a power transmission apparatus for automotive vehicle, and more specifically to a gear apparatus small in size, long in life time, and excellent in lubrication.

2. Description of the Prior Art

An example of prior-art gear apparatus is disclosed in Japanese Published Unexamined Patent Appli. No. 58-63523, as shown in FIG. 1. In this prior-art gear apparatus, engine power is first applied to a center differential gear 101, and then transmitted to right and left front wheel drive shafts 109 and 111 via a front differential gear 107, and further to a propeller shaft via two bevel gears 123 and 125. In more detail with reference to FIG. 1, an engine power is transmitted from a transmission (not shown) to the center differential gear 101 to differentially drive two front wheel drive shafts 109 and 111 and a propeller shaft. When a first side gear 103 of the center differential gear 101 is driven, engine power is transmitted to the front differential gear 107 via a first hollow drive shaft 105 to differentially drive the right and left front wheel drive shafts 109 and 111. On the other hand, when a second side gear 113 of the center differential gear 101 is driven, engine power is transmitted to a propeller shaft (not shown) to drive the rear wheel drive shafts by way of a second hollow drive shaft 115, a large-diameter transmission gear 117 spline engaged with the second hollow drive shaft 115, a small-diameter transmission gear 119 in mesh with the large-diameter transmission gear 117, an intermediate shaft 121 spline engaged with the small-diameter transmission gear 119, a first bevel gear 123 spline engaged with the intermediate shaft 121, and a second bevel gear 125 fixed to a drive pinion shaft in mesh with the first bevel gear 123. In the prior-art gear apparatus as shown in FIG. 1, the first bevel gear 123 and the intermediate shaft 121 are rotatably supported within a transfer case 131 via two opposingly disposed bearings 127 and 129. In this prior-art supporting structure, however, since the two opposing bearings 127 and 129 must be arranged outside the two bevel gears 123 and 125 and the small-diameter transmission gear 119, there exist various problems in that the distance between the two bearings is long; a radial load applied to the intermediate shaft 121 is not uniformly supported by the two bearings, so that the gear apparatus inevitably increases in size and decreases in life time. In addition, since the left side bearing 127 is located on the left side of the first bevel gear 123 within the transfer case 131, there exists another problem in that the bearing 127 is not sufficiently lubricated by lubricant put in the transfer case 131 and scattered by the rotation of the bevel gears 123 and 125 arranged within the transfer case 131.

SUMMARY OF THE INVENTION

With these problems in mind, therefore, it is the primary object of the present invention to provide a gear apparatus reliable stable in axle support, small in size and excellent in lubrication.

To achieve the above-mentioned object, the gear apparatus according to the present invention, comprises: a gear housing; a first axle (21) rotatably supported by first and second bearings (71, 73) within said gear housing; a first bevel gear (23) fixed to said first axle near the first bearing (71); a spur gear (19) fixed to said first axle between said first bevel gear (23) and the second bearing (73); a second axle (27) rotatably supported by third and fourth bearings (77, 79) within said gear housing and disposed perpendicular to said first axle (21), a second bevel gear (25) fixed to said second axle near the third bearing (77) in mesh with said first bevel gear; and the first bearing (71) for supporting said first axle (21) being located in the vicinity of a small-diameter side surface (83) of said second bevel gear (25) fixed to said second axle perpendicular to said first axle. Preferably, said first bearing (71) for supporting said first bevel gear (23) is located on an extension line of an axis (81) of said second rotary axle (27). Further, said second bevel gear (25) is formed with a recessed portion (85) in the small-diameter side surface (83) thereof; said gear housing is formed with a bearing support portion (87) for supporting the first bearing (71); and the bearing supporting portion (87) is located within the recessed portion (85) of said second bevel gear (25). Further, a center of the first bearing (71) is located on an extension line of a gearing contact line (89) between said first and second bevel gears (23, 25). The gear housing is a transfer case (51) including a center differential gear (5) and a clutch (29) for limiting differential motion of the center differential gear, and the gear apparatus is a power transmission apparatus for a 4-wheel drive vehicle.

In the gear apparatus according to the present invention, since the first bearing (71) for supporting the first axle (21) is located in the vicinity of the small-diameter end surface (83) of the second bevel gear (25) fixed to the second axle perpendicular to the first axle, it is possible to shorten the axial length of the first axle, uniformly support radial load applied to the spur gear by the two bearings on both the ends of the first axle, and sufficiently lubricate the first bearing by the rotating bevel gears.

DETAILED DESCRIPTION OF THE PREFERRED EMBODIMENTS

Figure 1:
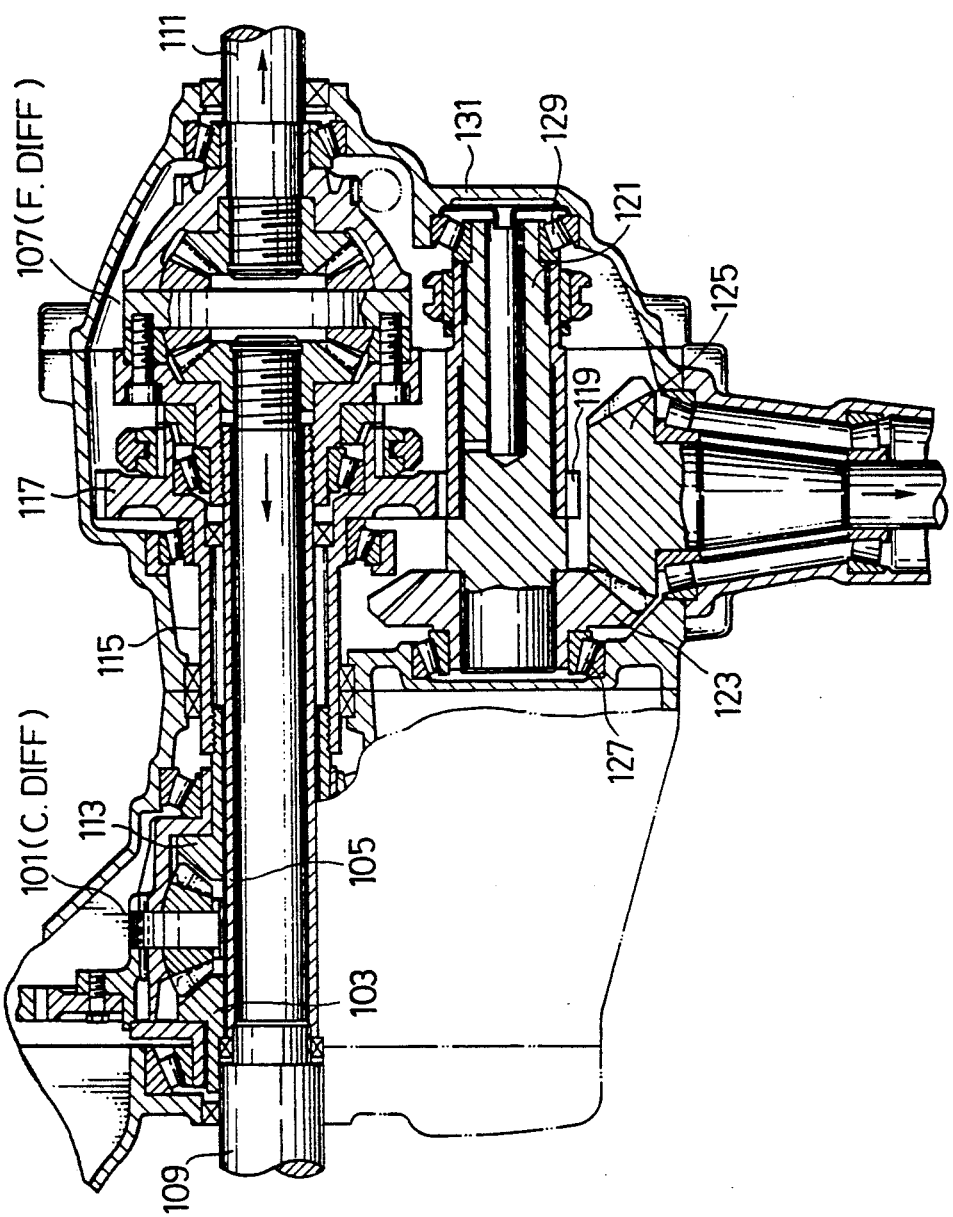
FIG. 1 is a longitudinal cross-sectional view showing a prior-art gear apparatus.
Figure 2:
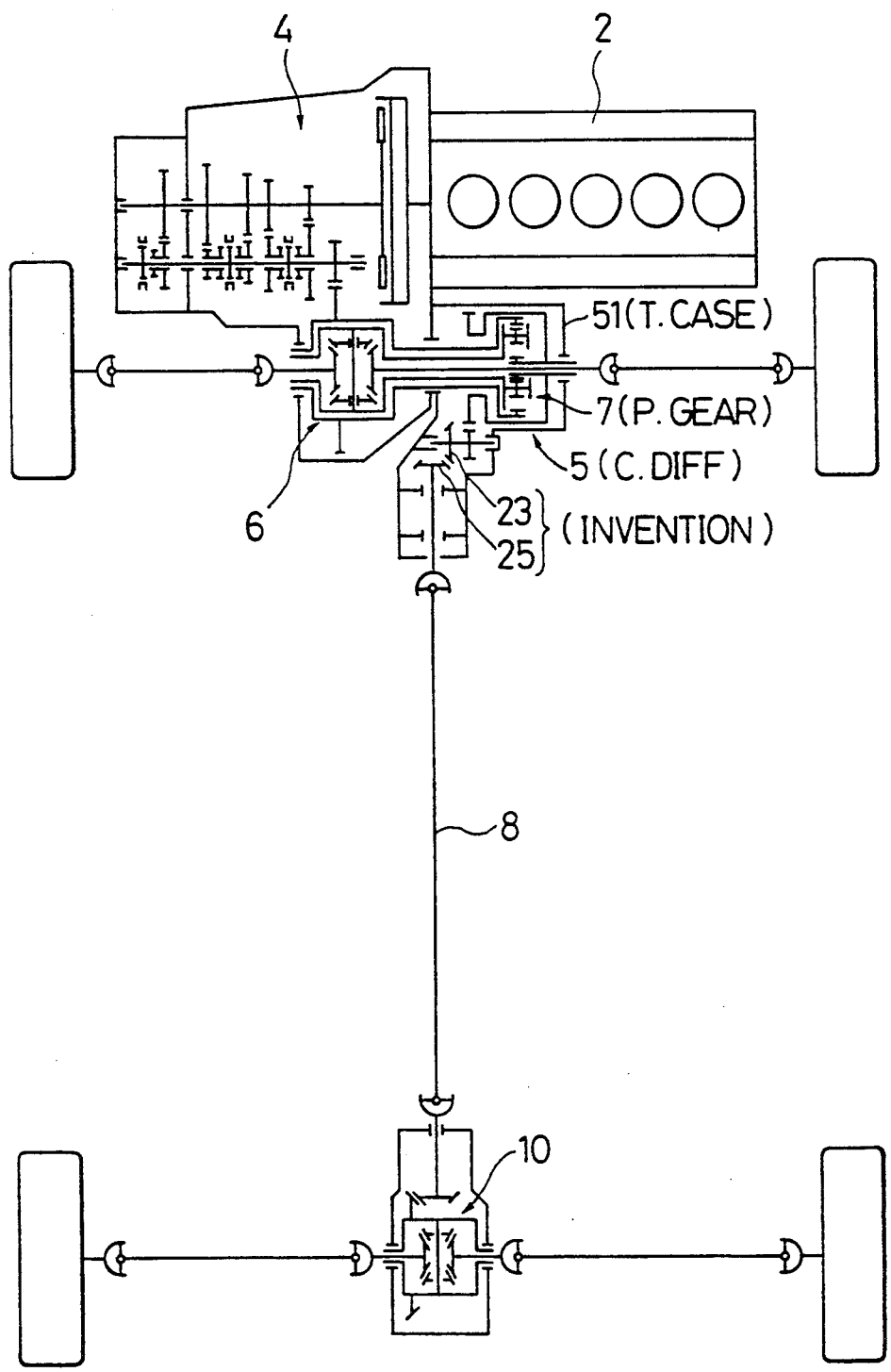
FIG. 2 is a skeletal diagram showing a power transmission system for an automotive vehicle, to which the gear apparatus according to the present invention is preferably applicable.

An embodiment of the present invention will be described hereinbelow with reference to the attached drawings. FIG. 2 shows a power transmission system of transfer apparatus type for differentially driving front and rear wheel drive shafts for a 4-wheel drive vehicle, to which a gear apparatus according to the present invention is applied by way of example. In FIG. 2, an engine power generated by an engine 2 is transmitted via a transmission 4 to a center differential gear 5 (planetary gear mechanism 7) housed within a transfer case 51, and further transmitted differentially to right and left front wheel drive shafts via a front differential gear 6 and further differentially to right and left rear wheel drive shafts via a propeller shaft 8 and a rear differential gear 10.

Figure 3:
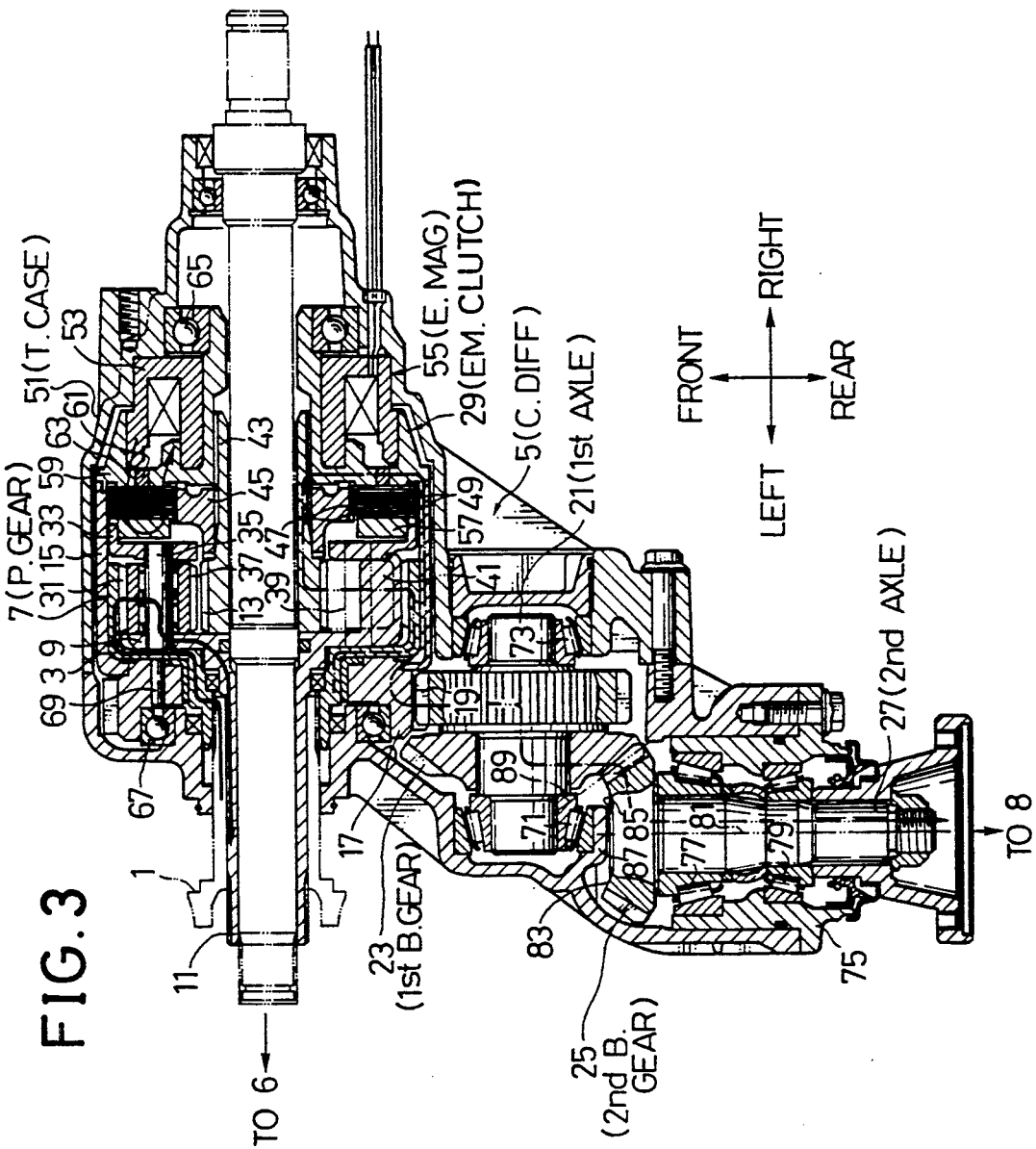
FIG. 3 is a longitudinal cross-sectional view showing an embodiment of the gear apparatus according to the present invention.

FIG. 3 shows a longitudinal cross-sectional view showing a gear apparatus including the central differential gear 5 of planetary gear mechanism (7) type, an electromagnetic multidisk clutch 29, two bevel gears 23 and 25, etc.

In FIG. 3, an engine power transmitted through the transmission 4 is given to the center differential gear 5 or the planetary gear mechanism 7 via an outer hollow shaft 1 and an outer hollow member 3 spline engaged with the outer hollow shaft 1. The planetary gear mechanism 7 is composed of a planetary carrier 9, a clutch drum 33 formed integral with the planetary carrier 9, outer planetary gears 37 rotatably supported by axles 35 fixedly supported between the planetary carrier 9 and the clutch drum 33 and in mesh with an internal gear 31 formed on an internal circumference of the outer hollow member 3, inner planetary gears 41 rotatably supported by axles 39 fixedly supported between the planetary carrier 9 and the clutch drum 33 and in mesh with the outer planetary gears 37, and a sum gear 13 in mesh with the inner planetary gears 41.

The electromagnetic multidisk clutch 29 (not shown in FIG. 2) is provided to connect the planetary carrier 9 with the sun gear 13, which is composed of a rotary member 45 spline engaged with a boss portion 43 of the sun gear 13, a plurality of inner friction disks 47 axially slidably engaged with teeth portions of the rotary member 45, a plurality of outer friction disks 49 also axially slidably engaged with teeth portions of the clutch drum 33 in mutually juxtaposed positional relationship with respect to each other, an annular electromagnet 55 fixed to the transfer case 51 via a yoke 53, an attracted member 57 disposed opposingly to the electromagnet 55 so as to sandwich the inner and outer friction disks between the attracted member 57 and the electromagnet 55.

A rotary case 15 is rotatably supported within the transfer case 51. The right opening portion of the rotary case 15 is fixedly closed by a case end plate 59. This case end plate 59 includes an annular nonmagnetic material element 61 to form an axially extending magnetic circuit through the case end plate 59 between the yoke 53 and the attracted member 57, so that magnetic flux 63 flows axially through the inner and outer friction disks 47 and 49, without being shorted in the radial direction of the case end plate 59.

Therefore, engine power is transmitted from the outer hollow member 3 to the front differential gear 6 by way of the internal gear 31 of the outer hollow member 3, the outer planetary gears 37, the axles 35, the planetary carrier 9, and an inner hollow shaft 11, as show by a thick line in FIG. 3. Further, engine power is differentially transmitted to the right and left front wheel drive shafts via the front differential gear 6. On the other hand, engine power is differentially transmitted to the propeller shaft 8 by way of the internal gear 31 of the outer hollow member 3, the outer planetary gears 37, the inner planetary gears 41, the sun gear 13, the case end plate 59 spline engaged with the sun gear 13, the rotary case 15 fixed to the case end plate 59, a first spur gear 17 fixed to the rotary case 15, a second spur gear 19 in mesh with the first spur gear 17, a first (intermediate) axle 21 of the second spur gear 19, first and second bevel gears 23 and 25, and a second (drive pinion) axle 27, as shown by a thick dot-dashed line in FIG. 3. Further, engine power transmitted to the propeller shaft 8 is further differentially transmitted to the right and left rear wheel drive shafts via the rear differential gear 10.

In the above-mentioned gear apparatus shown in FIG. 3, various rotary elements are supported as follows:

The case end plate 59 fixed to the rotary case 15 is rotatably supported by the transfer case 51 via a right side ball bearing 65, and the first spur gear 17 fixed to the rotary case 15 is also rotatably supported by the transfer case 51 via a left side ball bearing 67. This first spur gear 17 is formed with an oil supply hole 69 for lubrication of the bearing 67.

The first (intermediate) axle 21 of the second spur gear 19 and the first bevel gear 23 is rotatably supported by the transfer case 51 via first (left) and second (right) taper roller bearings 71 and 73 on the rear (lower) side of the transfer case 51. On the other hand, a second (drive pinion) axle 27 of the second bevel gear 25 is rotatably supported by a bearing member 75 fixed to the rear most portion of the transfer case 51 via first (front) and second (rear) taper roller bearings 77 and 79, being arranged perpendicular to the first (intermediate) axle 21.

The feature of the gear apparatus according to the present invention resides in the supporting arrangement of these two (first and second) axles 21 and 27. That is, the first (left) taper roller bearing 71 for the first axle 21 is located approximately on an extension line of the central axis 81 of the second (drive pinion) axle 27 in the vicinity of a small-diameter (front) end surface 83 of the second bevel gear 25 fixed to the second axle 27. In more detail, a bearing supporting portion 87 of the transfer case 71 (for supporting the first (left) bearing 71) is disposed within a recessed portion 85 formed in the small-diameter side surface 83 of the second bevel gear 25 in the close vicinity of the second bevel gear 25. In addition, the second spur gear 19 is fixed in back of and in the close vicinity of a large-diameter (right) side surface of the first bevel gear 23.

In the above-mentioned bevel gear supporting structure, it is possible to locate the second bevel gear 25 of the second (drive pinion) axle 27 sufficiently near the first axle 21. In addition, since the diameter of the first bevel gear 23 fixed to the first axle 21 can be designed freely in such a way that the first bevel gear 23 is in mesh with the second bevel gear 25, it is possible to freely determine the gear ratio of the two bevel gears 23 and 25 according to the necessity.

Further, since the first bearing 71 for the first axle 21 is located substantially on the central axis 81 of the second axle 27, it is possible to locate the first bevel gear 23 fixed to the first axle 21 sufficiently close to the first bearing 71. Therefore, it is possible to uniformly receive the radial load applied to the second spur gear 19 by both the first and second bearings 71 and 73, because the second spur gear 19 is fixed to roughly the axially middle portion of the first axle 21. Further, since the first bearing 71 for the first axle 21 is located near the central axis 81 of the second bevel gear 25, the first bearing 71 is close to a gearing contact line 89 between the first and second bevel gears 23 and 25, so that lubricant is sufficiently supplied to the first bearing 71 to improve the life time of the first bearing 71. Furthermore, since the axial length between the first and second bearings 71 and 73 can be shorted, it is possible to reduce the size of the transfer case 51.

The operation of the center differential gear 5 shown in FIG. 3 will be described hereinbelow.

When the electromagnet 55 is deenergized, since the electromagnetic multidisk clutch 29 is disengaged, the planetary carrier 9 is released from the sun gear 13, so that the planetary gear 7 functions as a differential gear in such a way that a rotary power is transmitted from the planetary carrier 9 to the sun gear 13 via the outer and inner planetary gears 37 and 41 both revolving around the sun gear 13. Therefore, engine power supplied via the transmission 4 is transmitted to the planetary gear mechanism 7 of the center differential gear 5 via the outer hollow shaft 1 and the outer hollower member 3. The power transmitted to the outer hollow member 3 is divided from the internal gear 31 of the outer hollow member 3 to the planetary carrier 9 and the sun gear 13. The power transmitted to the planetary carrier 9 is transmitted to the front differential gear 6 via the left side inner hollow shaft 11 in order to differentially drive the right and left front wheel drive shafts, as shown by a thick solid line in FIG. 3. On the other hand, the power transmitted to the sun gear 13 is transmitted to the first (intermediate) axle 21 by way of the boss portion 43 of the sun gear 13, the case end plate 59, the rotary case 15, the first and second spur gears 17 and 19, and further to the second axle (drive pinion shaft) 27 via the first and second bevel gears 23 and 25, in order to differentially drive the right and left rear wheel drive shafts via the propeller shaft 8 and the rear differential gear 10.

Under these conditions, when there exists a difference in the driving resistance between the front and rear wheels, the power is differentially distributed to the front and rear wheels according to the difference, because engine power is transmitted from the planetary carrier 9 to the sun gear 13 on the basis of the rotation on their own axes and the revolutions around the sun gear of the outer and inner planetary gears 37 and 41.

On the other hand, when the electromagnet 55 is energized, since the attracted member 57 is attracted toward the yoke 53, the multidisks 47 and 49 are coupled to each other to engage the electromagnetic clutch 29, so that the rotary member 45 is coupled with the clutch drum 33 to connect the planetary carrier 9 with the sun gear 13. Therefore, since the differential operation of the center differential gear 5 can be limited by the coupling force of the electromagnetic multidisk clutch 29 generated between the planetary carrier 9 and the sun gear 13 according to the intensity of current passed through the electromagnet 55, it is possible to freely control the differential power distribution to the front and rear wheel drive shafts. In this connection, the intensity of current passed through the electromagnet 55 can be controlled manually by the driver or automatically according to the steering conditions or road surface conditions.

As described above, in the gear apparatus according to the present invention, since the first bearing 71 of the first axle 21 is located substantially close to the central axis 81 of the second axle 27 and in the vicinity of the small-diameter side surface 83 of the second bevel gear 25, it is possible to shorten the axial length of the first axle 21 and further to uniformly support the radial load applied to the first axle 21 by the two opposing bearings 71 and 73. In addition, since the first bearing 71 can be well lubricated by the gearing motion of the first and second bevel gears 23 and 25, the size of the gear apparatus can be decreased and the life time of the first bearing 17 can be increased.

What is claimed is:

1. A gear apparatus, comprising:
   (a) a gear housing;
   (b) a first axle rotatably supported by first and second bearings within said gear housing;
   (c) a first bevel gear fixed to said first axle near the first bearings;
   (d) a spur gear fixed to said first axle between said first bevel gear and the second bearing;
   (e) a second axle rotatably supported by third and fourth bearings within said gear housing and disposed perpendicular to said first axle,
   (f) a second bevel gear fixed to said second axle near the third bearing in mesh with said first bevel gear; and
   (g) the first bearing for supporting said first axle being located on two extension lines of an axis of said second rotary axle and a gearing contact line between said first and second bevel gears.

2. A gear apparatus, comprising:
   (a) a gear housing;
   (b) a first axle rotatably supported by first and second bearings within said gear housing;
   (c) a first bevel gear fixed to said first axle near the first bearings;
   (d) a spur gear fixed to said first axle between said first bevel gear and the second bearing;
   (e) a second axle rotatably supported by third and fourth bearings within said gear housing and disposed perpendicular to said first axle,
   (f) a second bevel gear fixed to said second axle near the third bearing in mesh with said first bevel gear; and
   (g) said first bearing for supporting said first bevel gear located on an extension line of an axis of the second rotary axle.

3. The gear apparatus of claim 1, wherein said second bevel gear is formed with a recessed portion in a small-diameter side surface thereof; said gear housing is formed with a bearing support portion for supporting the first bearing; and the bearing supporting portion is located within the recessed portion of said second bevel gear.

4. A gear apparatus, comprising:
   (a) a gear housing;
   (b) a first axle rotatably supported by first and second bearings within said gear housing;
   (c) a first bevel gear fixed to said first axle near the first bearings;
   (d) a spur gear fixed to said first axle between said first bevel gear and the second bearing;
   (e) a second axle rotatably supported by third and fourth bearings within said gear housing and disposed perpendicular to said first axle,
   (f) a second bevel gear fixed to said second axle near the third bearing in mesh with said first bevel gear; and
   (g) first bearing for supporting said first axle, wherein a center of the first bearing is located on an extension line of a gearing contact line between said first and second bevel gears.

5. The gear apparatus of claim 1, wherein said gear housing is a transfer case including a center differential gear and a clutch for limiting differential motion of the center differential gear.

6. The gear apparatus of claim 5, wherein the gear apparatus is a power transmission apparatus for a 4-wheel drive vehicle.

* * * * *

UNITED STATES PATENT AND TRADEMARK OFFICE
CERTIFICATE OF CORRECTION

PATENT NO. : 5,146,801
DATED : September 15, 1992
INVENTOR(S) : Atsushi Oda

It is certified that error appears in the above-indentified patent and that said Letters Patent is hereby corrected as shown below:

On the Title page, item [75], inventor: should be --Atsushi--.

Signed and Sealed this

Nineteenth Day of October, 1993

Attest:

BRUCE LEHMAN

Attesting Officer  Commissioner of Patents and Trademarks